US009939027B2

(12) United States Patent
Damm et al.

(10) Patent No.: US 9,939,027 B2
(45) Date of Patent: Apr. 10, 2018

(54) SWITCHING DEVICE FOR A MOTOR VEHICLE TRANSMISSION AND METHOD FOR ACTUATING A MOTOR VEHICLE TRANSMISSION

(71) Applicant: HOERBIGER Antriebstechnik Holding GmbH, Schongau (DE)

(72) Inventors: Ansgar Damm, Kinsau (DE); Peter Echtler, Schongau (DE); Michael Koelzer, Rosshaupten (DE); Juergen Ackermann, Waal (DE); Kjell Lundin, Zwingenberg (DE)

(73) Assignee: HOERBIGER Antriebstechnik Holding GmbH, Schongau (DE)

( * ) Notice: Subject to any disclaimer, the term of this patent is extended or adjusted under 35 U.S.C. 154(b) by 258 days.

(21) Appl. No.: 14/939,622

(22) Filed: Nov. 12, 2015

(65) Prior Publication Data
US 2016/0146268 A1 May 26, 2016

(30) Foreign Application Priority Data

Nov. 24, 2014 (DE) .......................... 10 2014 117 194

(51) Int. Cl.
*F16D 23/06* (2006.01)
*F16D 23/04* (2006.01)
(Continued)

(52) U.S. Cl.
CPC ............ *F16D 23/04* (2013.01); *F16D 63/006* (2013.01); *F16D 2023/0681* (2013.01);
(Continued)

(58) Field of Classification Search
CPC ............ F16D 23/04; F16D 2023/0681; F16D 2023/0693; F16D 25/0632; F16D 25/0638;
(Continued)

(56) References Cited

U.S. PATENT DOCUMENTS 4,735,108 A * 4/1988 Teraoka .................. F16D 23/04
192/48.8
5,188,374 A * 2/1993 Gorman .............. F16D 25/0632
277/500

(Continued)

FOREIGN PATENT DOCUMENTS

DE 10244523 A1 4/2004
DE 102013221106 A1 4/2014

OTHER PUBLICATIONS

German Office Action dated Aug. 21, 2015 from corresponding DE Application No. 10 2014 117 194.2, along with partial unofficial English translation.

(Continued)

*Primary Examiner* — Stacey Fluhart
(74) *Attorney, Agent, or Firm* — Dilworth IP LLC (57) ABSTRACT

A switching device for a motor vehicle transmission includes a coupling component, several transmission shafts which each are rotatable about a transmission axis, a frictional contact ring including a friction cone and being substantially non-rotatably and axially shiftably connected with a transmission shaft, a form-fit ring including a cone surface and being substantially non-rotatably and axially shiftably connected with the coupling component, as well as an actuating body including a cone surface and being substantially non-rotatably and axially shiftably connected with the coupling component. The friction cone of the frictional contact ring extends between the cone surface of the form-fit ring and the cone surface of the actuating body. The transmission shaft and the coupling component are decoupled in direction of rotation in an axial starting position of the actuating body, frictionally coupled in direction of rotation in an axial frictional contact position of the actuating body and positively coupled in direction of rotation in an axial form-fit position of the actuating body. The (Continued)

form-fit ring in a form-fit position is positively connected with the transmission shaft and in a release position is not positively connected with the transmission shaft. The form-fit ring is axially movable between its form-fit position and its release position and is urged into the release position. In addition, a method for actuating a motor vehicle transmission is provided.

20 Claims, 8 Drawing Sheets

(51) Int. Cl.
*F16D 63/00* (2006.01)
*F16H 3/66* (2006.01)

(52) U.S. Cl.
CPC ........ *F16H 3/66* (2013.01); *F16H 2200/2012* (2013.01); *F16H 2200/2046* (2013.01)

(58) Field of Classification Search
CPC .......... F16D 11/14; F16D 13/32; F16D 13/24; F16D 13/38; F16D 23/025
See application file for complete search history.

(56) References Cited

U.S. PATENT DOCUMENTS

| 5,735,767 | A | * | 4/1998 | Forsyth | F16D 23/06 |
| | | | | | 475/205 |
| 7,281,618 | B2 | * | 10/2007 | Ebenhoch | F16D 23/06 |
| | | | | | 192/53.1 |
| 9,022,894 | B2 | | 5/2015 | Goleski et al. | |
| 2007/0295575 | A1 | * | 12/2007 | Turner | F16D 23/04 |
| | | | | | 192/85.21 |
| 2009/0215567 | A1 | | 8/2009 | Iwasaki et al. | |
| 2012/0247913 | A1 | | 10/2012 | Nakano et al. | |

OTHER PUBLICATIONS

German Office Action dated Nov. 13, 2015 from corresponding DE Application No. 10 2014 117 194.2, along with partial unofficial English translation.

\* cited by examiner

SWITCHING DEVICE FOR A MOTOR VEHICLE TRANSMISSION AND METHOD FOR ACTUATING A MOTOR VEHICLE TRANSMISSION

TECHNICAL FIELD

This invention relates to a switching device for a motor vehicle transmission, in particular for a fully automatic stepped transmission, and to a method for actuating a motor vehicle transmission.

BACKGROUND OF THE INVENTION

In automotive engineering, automatic transmissions, in particular stepped fully automatic transmissions with hydrodynamic torque converter and planetary transmissions are used for power transmission beside manual variable-speed transmissions.

Such fully automatic stepped transmissions act as powershift transmissions without interruption of the tractive force, wherein the power flow is effected via planetary gearsets and the gear changes occur by coupling or releasing individual planetary gearset elements. The coupling of individual planetary gearset elements at present mostly is effected by means of multidisk clutches which, however, are constructionally complex and heavy as well as require an undesirably large installation space. Since the multidisk clutches must be designed for a maximum torque to be transmitted, many friction points or disks moreover are necessary for the torque transmission. Due to the numerous friction points, the undesired drag torques are quite high in the decoupled condition and have a disadvantageous effect on the transmission efficiency.

It is the object of the invention to create a switching device for an automatic motor vehicle transmission, which is constructed particularly compact, can be manufactured easily and at low cost and provides for a particularly high transmission efficiency.

BRIEF SUMMARY OF THE INVENTION

This is achieved in a switching device including a coupling component, several transmission shafts which each are rotatable about a transmission axis, a frictional contact ring including a friction cone and being substantially non-rotatably and axially shiftably connected with a transmission shaft, a form-fit ring including a cone surface and being substantially non-rotatably and axially shiftably connected with the coupling component, as well as an actuating body including a cone surface and being substantially non-rotatably and axially shiftably connected with the coupling component. The friction cone of the frictional contact ring extends between the cone surface of the form-fit ring and the cone surface of the actuating body. The transmission shaft and the coupling component are decoupled in direction of rotation in an axial starting position of the actuating body, frictionally coupled in direction of rotation in an axial frictional contact position of the actuating body and positively coupled in direction of rotation in an axial form-fit position of the actuating body. The form-fit ring in a form-fit position is positively connected with the transmission shaft and in a release position is not positively connected with the transmission shaft. The form-fit ring is axially movable between its form-fit position and its release position and is urged into the release position. In functional terms, the switching device thus is a cone clutch with form-fit engagement, wherein the components to be coupled preferably are urged into a decoupled starting position. As compared to a conventional multidisk clutch, such switching device is constructed distinctly more compact and can be actuated in a considerably more energy-efficient manner. Since in the decoupled condition of the switching device the maximum torque to be transmitted can be transmitted by form-fit engagement, less friction points are required as compared to a conventional multidisk clutch, which leads to a distinct reduction of the drag torques and hence has a positive influence on the transmission efficiency. The frictional contact position of the actuating body preferably is located axially between the starting position and the form-fit position of the actuating body and forms a kind of axial intermediate position into which the actuating body can be moved with comparatively little energy expenditure. For numerous load cases, however, a torque transmission capacity of the switching device in the frictional contact position of the switching device already is sufficient for torque transmission, so that no further movement of the actuating body into its form-fit position is necessary. This also has a positive influence on the transmission efficiency. Merely in load cases with very high torque load is the actuating body moved into its form-fit position with further energy expenditure, in order to increase the torque transmission capacity of the switching device.

According to one embodiment of the switching device, the coupling component is a transmission housing, so that the switching device acts as brake which is able to slow down the rotatable transmission shaft and to non-rotatably fix the same at the housing.

According to an alternative embodiment of the switching device, the coupling component is one of a further transmission shaft and a transmission shaft element firmly connected with the further transmission shaft. The two separate transmission shafts in particular are coaxially arranged transmission shafts of different planetary gearsets which experience a speed adaptation by the switching device.

Preferably, the friction cone includes a cone-shaped friction surface adjoining the cone surface of the actuating body as well as an opposite cone-shaped friction surface adjoining the cone surface of the form-fit ring, wherein the friction surfaces and the cone surfaces are formed coaxial and substantially parallel. In this way, the rotation of the transmission shaft can be adapted to the rotational speed of the coupling component easily and quickly in the manner of a multiple synchronization of manually operated transmissions, wherein a coupling component formed as transmission housing has the speed zero.

The cone surfaces and the friction surfaces preferably include a cone angle $\alpha$, with $5° \leq \alpha \leq 15°$, in particular $\alpha \approx 10°$, wherein the cone angle corresponds to half the opening angle of a cone. A hydraulic pressure usual for the transmission hydraulics, which acts on the actuating body of the switching device, at these cone angles is sufficient to realize a fast speed adaptation. Furthermore, these cone angles lie outside a self-locking range, wherein the force necessary for decoupling the switching device particularly preferably lies in the range of the spring force of a usual standard spring, so that simple and energy-saving decoupling is possible.

According to another embodiment of the switching device the coupling component includes an axial stop for the actuating body, the axial stop defining the starting position. Due to the spring load acting against the axial stop, no pressurization of the actuating body is necessary in the starting position, which contributes to a particularly energy-efficient operation of the switching device.

Preferably, the actuating body spring element on the one hand supports on the coupling component and on the other hand on the actuating body and in particular is formed as disk spring. Disk springs permanently provide a largely constant spring force, which in the present case ensures a reliable return movement of the actuating body. In addition, disk springs can be manufactured easily and at low cost.

According to another embodiment of the switching device, one of the transmission shaft and a transmission shaft element firmly connected with the transmission shaft includes an axial stop for the frictional contact ring, the axial stop defining a ventilation position of the frictional contact ring. In the ventilation position, the friction cone is spaced from the adjoining cone surfaces of the form-fit ring and the actuating body.

Preferably, a frictional contact ring spring element is provided, which axially urges the frictional contact ring into the ventilation position, wherein the frictional contact ring is movable between the ventilation position and a frictional contact position. The frictional contact ring spring element on the one hand can support on the transmission shaft and on the other hand on the frictional contact ring and in particular can be formed as disk spring. As already mentioned above, disk springs permanently provide a largely constant spring force which in the present case ensures a reliable decoupling of the transmission shaft from the coupling component. Undesired drag torques which might lead to an impairment of the transmission function thus are at least strongly reduced, ideally even prevented completely, by the frictional contact ring spring element.

According to another embodiment of the switching device the coupling component includes an axial stop for the form-fit ring, the axial stop defining a release position of the form-fit ring. In the release position of the form-fit ring, the transmission shaft and the form-fit ring do not form a positive connection in direction of rotation and moreover at best are coupled indirectly (via the frictional contact ring) in direction of rotation.

Preferably, a form-fit ring spring element is provided, which axially urges the form-fit ring into the release position, wherein the form-fit ring is movable between the release position and a form-fit position. The form-fit ring spring element on the one hand can support on the coupling component and on the other hand on the form-fit ring and in particular can be formed as wave spring pack or spiral spring pack. The flat spring characteristic desired for the form-fit ring spring element with a high spring force in the order of magnitude of several Kilonewton can be realized easily and at low cost by means of a strongly pretensioned wave spring pack or spiral spring pack.

Particularly preferably, the actuating body can be urged axially in direction of its form-fit position by a variable actuating force, wherein the form-fit ring spring element applies a spring force onto the form-fit ring against the actuating force, the spring force corresponding to about 60%-90%, preferably about 70%-80% of a maximum actuating force. Thus, the form-fit ring only is moved into its form-fit position with a high actuating force against the spring force of the form-fit ring spring element, so that a large fraction of the variable actuating force is available as control range for the frictional connection. This results in an advantageous, particularly sensible control of the slip range in the switching device.

According to another embodiment of the switching device, a first toothing is formed on the form-fit ring and a second toothing axially adjoining the first toothing is formed on one of the transmission shaft and a transmission shaft element firmly connected with the transmission shaft, wherein the toothings engage into each other in an axial form-fit position of the form-fit ring and positively connect the transmission shaft with the coupling component in direction of rotation. This positive, in particular non-rotatable connection between the transmission shaft and the coupling component via toothings engaging into each other permanently provides for an almost wear-free transmission of large transmission torques.

In this embodiment, the toothings can include a plurality of teeth distributed in direction of rotation, wherein each tooth of a toothing includes two opposite tooth flanks inclined with respect to the axial direction, the two opposite tooth flanks axially converging towards the other toothing in a wedge-shaped manner. During the formation of the positive connection between the transmission shaft and the coupling component, the beveled tooth flanks facilitate the engagement of the toothings into each other, which contributes to a particularly fluent and jerk-free switching operation. In addition, the beveled tooth flanks also facilitate the separation of the positive connection under load.

According to another embodiment of the switching device, the coupling component includes a cylinder portion and the actuating body is designed as piston, the piston being axially shiftably guided in the cylinder portion.

The cylinder portion and the piston in this embodiment in particular define a pressurizable chamber for the axial displacement of the piston. For example, a hydraulic pressure can be applied to this chamber, in order to brake the rotation of the transmission shaft or adapt it to the rotation of a further transmission shaft, Instead of a hydraulic actuation another suitable actuation, in particular an electromotive actuation of the switching device of course also is conceivable in the alternative.

The invention also includes a motor vehicle transmission with several switching devices, of which at least one switching device is designed as mentioned above, a drive shaft and a driven shaft, wherein each switching device is switchable into a decoupling condition and a coupling condition, and within the coupling condition the at least one switching device is switchable into a frictional contact position and a form-fit position, wherein to the at least one switching device a transmission shaft and a coupling component is associated, the transmission shaft and the coupling component in the decoupling condition being decoupled in direction of rotation and in the coupling condition being coupled in direction of rotation either only frictionally or frictionally and positively, wherein by various switching combinations of the switching devices gear ratios between the drive shaft and the driven shaft associated to individual gear stages of the motor vehicle transmission are adjustable, the at least one switching device assuming its decoupling condition in a predetermined gear stage, assuming its frictional contact position in another predetermined gear stage, and assuming its form-fit position in yet another gear stage of the motor vehicle transmission. Depending on a required torque transmission capacity in the respective gear stage, the coupling of the switching device selectively can be effected frictionally or frictionally and positively in contrast to the conventional automatic motor vehicle transmissions. In the case of a desired gear change, the motor vehicle transmission thus can be actuated in a particularly energy-efficient manner, which ultimately leads to a particularly high transmission efficiency.

The invention further provides a method for actuating a motor vehicle transmission including a drive shaft, a driven shaft and several switching devices, each switching device being switchable into a decoupling condition and a coupling condition and within the coupling condition at least one switching device is switchable into a frictional contact position and a form-fit position, wherein to the at least one switching device a transmission shaft and a coupling component are associated, the transmission shaft and the coupling component in the decoupling condition are decoupled in direction of rotation and in the coupling condition are coupled in direction of rotation either only frictionally or frictionally and positively. By various switching combinations of the switching devices, gear ratios between the drive shaft and the driven shaft associated to the individual gear stages of the motor vehicle transmission are adjusted, wherein during a change of the gear stage from the decoupling condition into the coupling condition or from the coupling condition into the decoupling condition at least one of the switching devices of the motor vehicle transmission is switched, in order to change the gear ratio. Furthermore, a further switching device which during this change of the gear stage is in the coupling condition and is not required for changing the gear ratio is switched from the frictional contact position into the form-fit position or from the form-fit position into the frictional contact position, in order to change a torque transmission capacity of this further switching device. The adaptation of the torque transmission capacity in the coupling condition of the switching device to the torque to be transmitted actually provides for a particularly energy-saving actuation of the motor vehicle transmission and leads to a particularly high transmission efficiency.

According to one method variant, the further switching device in its coupling condition transmits a torque between the associated transmission shaft and the associated coupling component, the further switching device in its frictional contact position having a first torque transmission capacity and in its form-fit position having a second torque transmission capacity greater than the first torque transmission capacity.

Preferably, a switching device in the frictional contact position is switched from the frictional contact position into the form-fit position, before during a change of the gear stage the first torque transmission capacity of this switching device is exceeded. In this way, a reliable torque transmission is ensured in the motor vehicle transmission with minimum energy expenditure. Such actuation of the respective switching device between the frictional contact position and the form-fit position can be implemented with little expenditure into a transmission controller of the motor vehicle transmission, as the torques to be transmitted at the individual switching devices are known for each gear stage due to the transmission design.

DETAILED DESCRIPTION OF THE PREFERRED EMBODIMENTS

Figure 1:
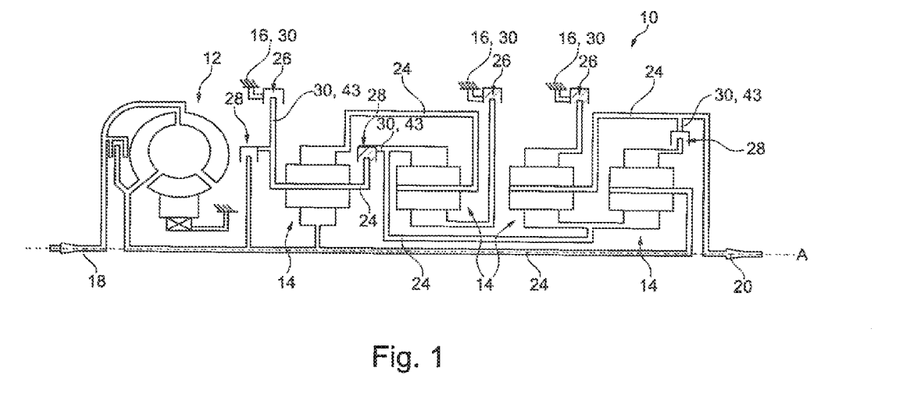
FIG. 1 shows a transmission diagram of a fully automatic stepped transmission with a switching device according to the invention.

FIG. 1 shows an electrohydraulically actuated, fully automatic stepped transmission 10 of a motor vehicle with a torque converter 12, four planetary transmissions or planetary gearsets 14 and a schematically indicated transmission housing 16. Furthermore a drive shaft 18, a driven shaft 20 and several transmission shafts 24 are provided, wherein in the following planetary gear carriers also are referred to as transmission shafts 24. The transmission shafts 24 are associated to the individual planetary gearsets 14 and arranged coaxially to each other.

The stepped transmission 10 in addition includes switching devices 26, 28, to which a hydraulic pressure can be applied and which can couple a transmission shaft 24 either with a further transmission shaft 24 or with the transmission housing 16 or can decouple the transmission shaft 24 from the further transmission shaft 24 or the transmission housing 16.

A switching device 26, which couples the transmission shaft 24 with the transmission housing 16 also is referred to as braking device, and a switching device 28, which couples two transmission shafts 24 with each other, also is referred to as coupling device. In the present exemplary embodiment six switching devices 26, 28 are provided, of which three switching devices 26 are formed as braking devices and three switching devices 28 are formed as coupling devices. According to FIG. 1, by way of example, two braking devices and one coupling device are in the coupled condition (indicated hatched) and one braking device and two coupling devices are in the decoupled condition.

By various switching combinations of the switching devices 26, 28 the gear ratios between the drive shaft 18 and the driven shaft 20 corresponding to the individual gear stages of the stepped transmission 10 then are obtained.

Since the general construction and mode of operation of fully automatic stepped transmissions 10 already is known in general from the prior art, the same will not be discussed further and in the following merely a method according to the invention for actuating the motor vehicle transmission and the constructive design and the function of the switching devices 26, 28 according to the invention will be described in detail.

Each switching device 26, 28 is switchable into a decoupling condition and a coupling condition and within the coupling condition at least one of the switching devices 26, 28 is switchable into a frictional contact position and a form-fit position, wherein to the at least one switching device 26, 28 a transmission shaft 24 and a coupling component 30 is associated, which in the decoupling condition are decoupled in direction of rotation and in the coupling condition are coupled in direction of rotation either only frictionally or frictionally and positively.

Gear ratios between the drive shaft 18 and the driven shaft 20, which are associated to individual gear stages of the stepped transmission 10, are adjusted by various switching combinations of the switching devices 26, 28. During a change of the gear stage at least one, preferably exactly two of the switching devices 26, 28 of the stepped transmission 10 are actuated such that they switch from their decoupling condition into the coupling condition or from the coupling condition into the decoupling condition, in order to change the gear ratio. At the same time, a further switching device 26, 28 in the coupling condition and not required for changing the gear ratio is actuated such that it switches from the frictional contact position into the form-fit position or from the form-fit position into the frictional contact position, in order to change a torque transmission capacity of this further switching device 26, 28. The adaptation of the torque transmission capacity in the coupling condition of the switching device 26, 28 to the torque to be transmitted actually provides for a particularly energy-saving actuation of the stepped transmission 10 and leads to a particularly high transmission efficiency.

In its coupling condition, the at least one switching device 26, 28 transmits a torque between the associated transmission shaft 24 and the associated coupling component 30, wherein in its frictional contact position the switching device 26, 28 has a first torque transmission capacity and in its form-fit position a second torque transmission capacity greater than the first torque transmission capacity.

According to a particularly advantageous method variant, the switching device 26, 28 in the frictional contact position is switched from the frictional contact position into the form-fit position, before during a change of the gear stage the first torque transmission capacity of this switching device 26, 28 is exceeded. In this way, a reliable torque transmission is ensured in the stepped transmission 10 with minimum energy expenditure.

Figure 2:
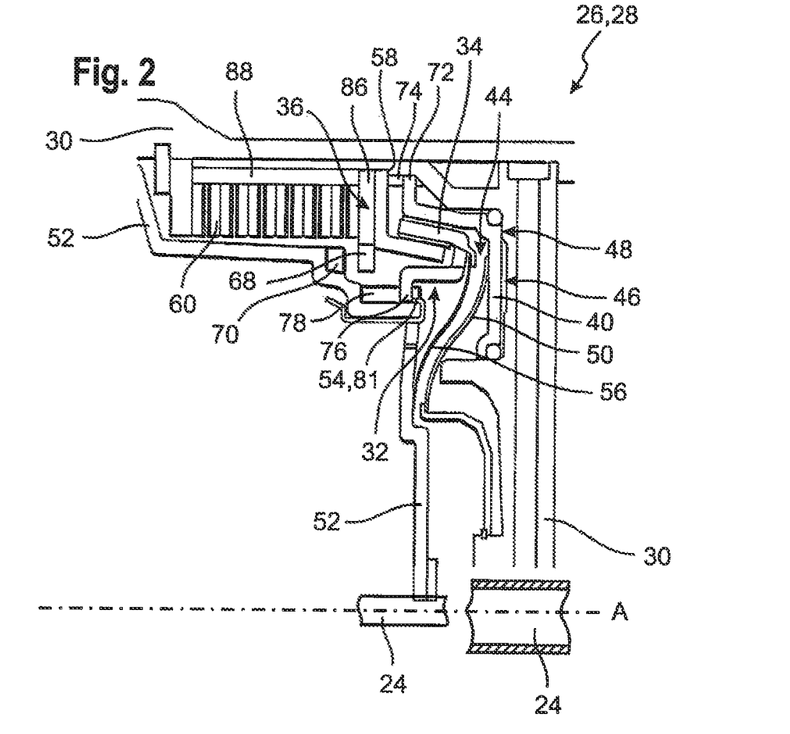
FIG. 2 a schematic section through the switching device according to the invention in an axial starting position of an actuating body.

FIG. 2 shows a section of a switching device 26, 28 for the fully automatic stepped transmission 10 according to FIG. 1, with a coupling component 30, the transmission shafts 24 which each are rotatable about a transmission axis A, a frictional contact ring 32 which includes a friction cone 34 and substantially is non-rotatably and axially shiftably connected with the transmission shaft 24, a form-fit ring 36 which includes a cone surface 38 and substantially is non-rotatably and axially shiftably connected with the coupling component 30, and an actuating body 40 which includes a cone surface 42 and substantially is non-rotatably and axially shiftably connected with the coupling component 30, wherein the friction cone 34 of the frictional contact ring 32 extends between the cone surface 38 of the form-fit ring 36 and the cone surface 42 of the actuating body 40.

The actuating body 40 is arranged to be axially shiftable, wherein in an axial starting position of the actuating body 40 the transmission shaft 24 and the coupling component 30 are decoupled in direction of rotation, i.e. freely rotatably relative to each other, in an axial frictional contact position of the actuating body 40 are frictionally coupled in direction of rotation, and in an axial form-fit position of the actuating body 40 are positively coupled in direction of rotation.

According to FIGS. 2 to 7 the coupling component 30 is formed by the transmission housing 16, so that the switching device 26 acts as braking device and can fax the transmission shaft 24 of a planetary gearset 14 at the transmission housing 16.

Figure 16:
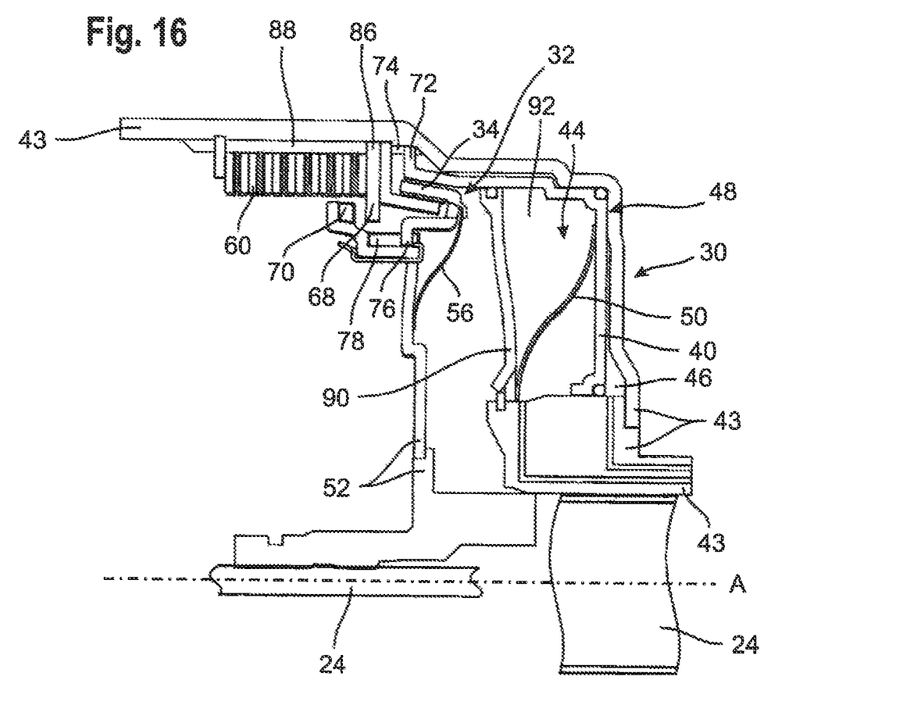
FIG. 16 shows a schematic section through another embodiment of the switching device according to the invention in an axial starting position of the actuating body.

Alternatively, the coupling component 30 is a transmission shaft element 43 firmly connected with a further transmission shaft 24 (see also FIG. 16). The switching device 28 then acts as coupling device which is able to couple the transmission shaft 24 of a planetary gearset 14 with the transmission shaft 24 of another planetary gearset 14 in direction of rotation such that the rotational speeds of the transmission shafts 24 initially are adapted to each other and thereafter the transmission shafts 24 substantially are non-rotatably connected either by frictional connection or by frictional connection and positive connection.

According to FIG. 2 the coupling component 30 includes a cylinder portion 44, and the actuating body 40 is designed as piston, wherein the piston is axially shiftably guided in the cylinder portion 44. The cylinder portion 44 and the piston define a sealed, pressurizable chamber 46 for the axial displacement of the piston. The actuating body 40 here is formed as piston with integrally molded cone surface 42. In particular for manufacturing reasons, however, it is also conceivable in the alternative that the actuating body 40 is formed in two parts and includes a piston element as well as a separate cone surface element firmly connected with the piston element.

In the present exemplary embodiment, the switching device 26 is part of an electrohydraulically actuated, fully automatic stepped transmission 10, so that the chamber 46 can be pressurized by the pressure of a hydraulic fluid, in order to influence, in particular brake, the rotation of the transmission shaft 24.

Instead of a hydraulic actuation an electromotive actuation of the switching device 26, 28 is of course also conceivable in the alternative.

Proceeding from a decoupled condition, a coupling operation of the switching device 26 will be described in the following with reference to FIGS. 2 to 7.

Figure 3:
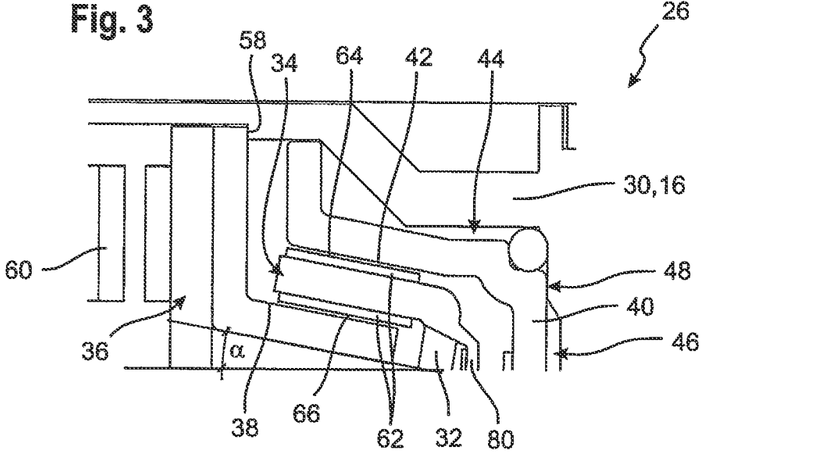
FIG. 3 shows a sectional detail of the switching device according to FIG. 2.

In the decoupled condition of the switching device 26 according to FIGS. 2 and 3, the transmission shaft 24 and the coupling component 30 are decoupled in direction of rotation, i.e. the transmission shaft 24 is freely rotatable relative to the coupling component 30.

In the decoupled condition, the actuating body 40 formed as piston is not pressurized or pressurized only to a negligeable extent and correspondingly is in its axial starting position which is defined by an axial stop 48 formed at the coupling component 30 (FIG. 2).

To avoid undesired drag torques in the decoupled condition of the switching device 26, an actuating body spring element 50 is provided, which urges the actuating body 40 into its starting position. The actuating body spring element 50 on the one hand supports on the actuating body 40 and on the other hand on the coupling component 30, so that the actuating body 40 is axially pressed against the axial stop 48 of the coupling component 30 and hence is securely held in its starting position.

In the decoupled condition of the switching device 26, the frictional contact ring 32 is in a "ventilation position", i.e. an axial position in which the cone surfaces 38, 42 of the form-fit ring 36 or the actuating body 40 are spaced from the friction cone 34 of the frictional contact ring 32 (see also FIG. 3).

According to FIG. 2, there is provided a transmission shaft element 52 firmly connected with the transmission shaft 24, wherein the ventilation position of the frictional contact ring 32 is defined by an axial stop 54 formed at the transmission shaft element 52.

Analogous to the actuating body 40, undesired drag torques are prevented in the decoupled condition of the switching device 26 in that the frictional contact ring 32 also is securely held in its ventilation position. For this purpose, a frictional contact ring spring element 56 is provided, which axially urges the frictional contact ring 32 into the ventilation position defined by the axial stop 54. The frictional contact ring spring element 56 on the one hand axially supports on the transmission shaft 24 via the transmission shaft element 52 and on the other hand on the frictional contact ring 32, so that the frictional contact ring 32 is pressed against the axial stop 54 of the transmission shaft element 52 and hence is securely held in its ventilation position.

In the decoupled condition of the switching device 26 the form-fit ring 36 is in an axial release position according to FIG. 2, wherein in the release position of the form-fit ring 36 the transmission shaft 24 and the form-fit ring 36 do not form a positive connection with each other in direction of rotation and moreover at best are indirectly coupled in direction of rotation via the frictional contact ring 32.

According to FIGS. 2 and 3, the coupling component 30 includes an axial stop 58 for the form-fit ring 36, e.g. formed by a shoulder, wherein the release position of the form-fit ring 36 is defined by the axial stop 58.

To prevent an inadvertent positive engagement between the form-fit ring 36 and the transmission shaft element 52 firmly connected with the transmission shaft 24, a form-fit ring spring element 60 is provided, which urges the form-fit ring 36 into the release position. The form-fit ring spring element 60 on the one hand supports on the coupling component 30 and on the other hand on the form-fit ring 36, so that the form-fit ring 36 is pressed against the axial stop 58 and thus is securely held in its release position.

FIG. 3 shows a detail of the switching device 26 according to FIG. 2 in the region of the friction cone 34. It can clearly be seen that the friction cone 34 each is coated with a friction lining 62 on a radial inside and a radial outside. The friction cone 34 of the frictional contact ring 32 thus includes a cone-shaped friction surface 64 adjoining the cone surface 42 of the actuating body 40 as well as an opposite friction surface 66 adjoining the cone surface 38 of the form-fit ring 36, wherein the friction surfaces 64, 66 and the cone surfaces 38, 42 are formed coaxial and substantially parallel. In this way, large friction forces can be realized during the coupling operation, which lead to a fast influence on the rotational speed of the transmission shaft 24.

Particularly preferably, the cone surfaces 38, 42 and the friction surfaces 64, 66 include a cone angle $\alpha$, with $5° \leq \alpha \leq 15°$, in particular $\alpha \approx 10°$. In this angular range, with a hydraulic pressure usual for the transmission hydraulics in the chamber 46 between the transmission shaft 24 and the transmission shaft element 52 a friction moment can be realized, which leads to a sufficiently fast speed adaptation. Furthermore, in this range of the cone angle $\alpha$ it also is ensured that the spring forces of the actuating body spring element 50 and of the frictional contact ring spring element 56 are sufficient to again reliably release the frictional connection on demand and move the actuating body 40 into its axial starting position and the frictional contact ring 32 into its ventilation position.

Figure 4:
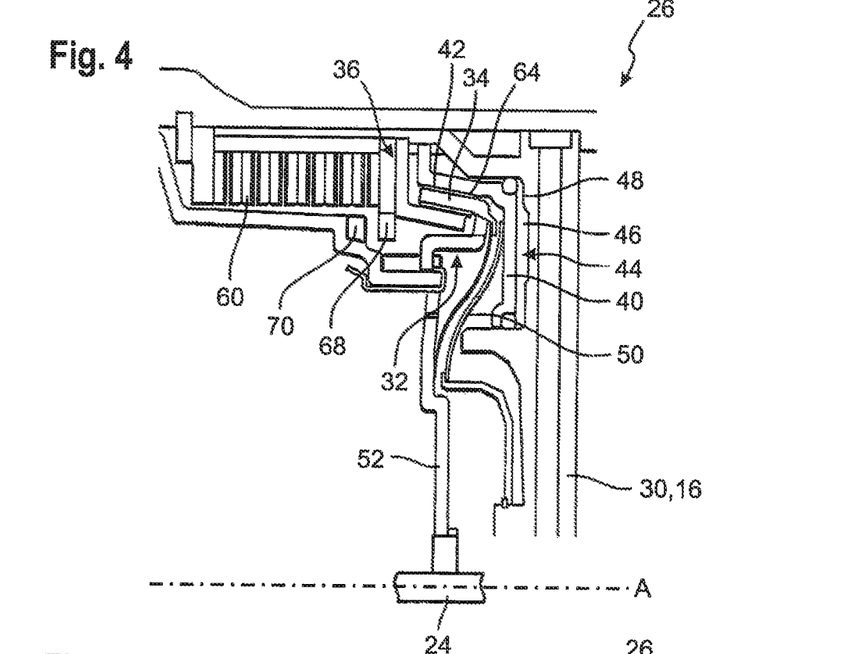
FIG. 4 shows a schematic section through the switching device according to the invention in an axial frictional position of the actuating body.

FIG. 4 shows the switching device 26 in the condition of a beginning frictional coupling between the transmission shaft 24 and the coupling component 30.

As a result of a pressurization of the chamber 46, the actuating body 40 formed as piston has axially released from its starting position according to FIG. 2 to such an extent that the cone surface 42 of the actuating body 40 already forms a first frictional contact with the friction surface 64 of the frictional contact ring 32. Thus, the actuating body 40 according to FIG. 4 already is in an axial frictional position.

As compared to FIGS. 2 and 3, however, nothing has changed yet as regards the axial position of the frictional contact ring 32 and of the form-fit ring 36.

Figure 5:
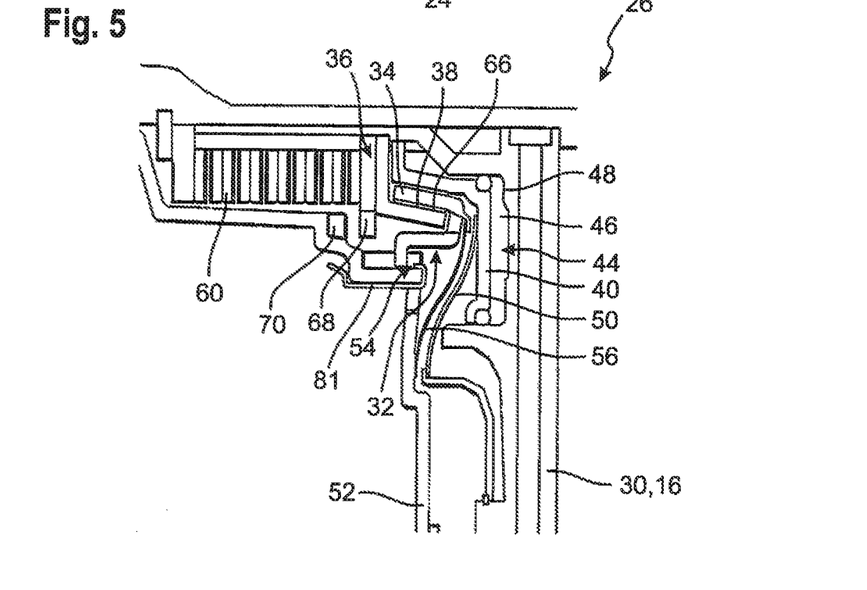
FIG. 5 shows another schematic section through the switching device according to the invention in an axial frictional position of the actuating body.

According to FIG. 5, the actuating body 40 axially has moved even further away from its starting position as compared to FIG. 4 due to an increase of the hydraulic pressure in the chamber 46 and now is in a frictional contact position. Due to this further axial movement of the actuating body 40, the frictional contact ring 32 now also has moved away from its axial stop 54 in axial direction. Correspondingly, the frictional contact ring 32 no longer is in its axial ventilation position according to FIGS. 2 to 4, but in an axial frictional contact position in which the friction surface 66 of the friction cone 34 also forms a frictional contact with the cone surface 38 of the form-fit ring 36. At this first frictional contact with the frictional contact ring 32, the form-fit ring 36 continues to be in its release position according to FIGS. 2 to 4.

Figure 6:
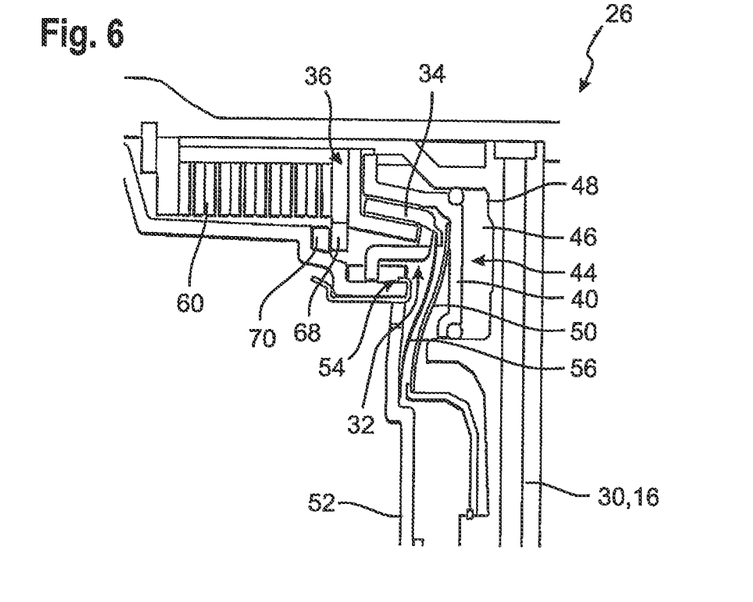
FIG. 6 shows a schematic section through the switching device according to the invention in an axial frictional contact position of the actuating body.

By a further increase of the hydraulic pressure in the chamber 46, the actuating body 40 according to FIG. 6 has moved even a bit further away from its axial starting position, but still is in its frictional contact position. As a result of the further movement of the actuating body 40, the form-fit ring 36 now also has axially released from its release position against the force of the form-fit ring spring element 60 and is located directly before a positive engagement with the transmission shaft element 52. Accordingly, the maximum frictional moment transmission between the transmission shaft 24 and the coupling component 30 occurs in the condition of the switching device 26 as shown in FIG. 6. Correspondingly, the switching device 26 has a first torque transmission capacity in this frictional contact position of the coupled condition.

Figure 7:
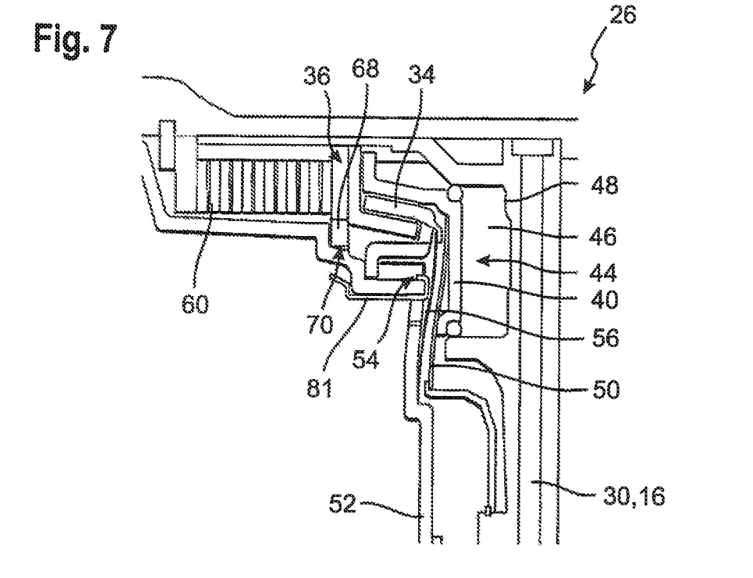
FIG. 7 shows a schematic section through the switching device according to the invention in an axial form-fit position of the actuating body.

FIG. 7 finally shows the positively coupled condition of the switching device 26, in which the actuating body 40 assumes a form-fit position, which corresponds to a maximum axial deflection of the actuating body 40 from its starting position according to FIG. 2. Due to the additional axial movement of the actuating body 40, the form-fit ring 36 also has axially moved further away from its release position according to FIGS. 2 to 4, as compared to FIG. 6, and has reached a form-fit position in which the form-fit ring 36 and the transmission shaft element 52 positively engage into each other in direction of rotation. In this form-fit position of the coupled condition, the switching device 26 has a larger, second torque transmission capacity as compared to the first torque transmission capacity.

Concretely, a first toothing 68 (see also FIG. 14) is formed at the form-fit ring 36 and a second toothing 70 (see also FIG. 13) axially adjoining the first toothing 68 is formed at the transmission shaft element 52, wherein the toothings 68, 70 according to FIG. 7 engage into each other in the axial form-fit position of the actuating body 40 and of the form-fit ring 36 and positively connect the transmission shaft 24 with the coupling component 30 in direction of rotation.

Due to the coupling operation of the switching device 26, the transmission shaft 24 consequently has been slowed down to a speed zero and has positively been fixed at the coupling component 30 formed by the transmission housing 16 in direction of rotation.

If the coupling component 30 alternatively is formed as transmission shaft element 43 firmly connected with the further transmission shaft 24, a speed synchronization and a positive connection of the transmission shafts 24 in direction of rotation is effected due to the coupling operation of the switching device 28.

Figure 8:
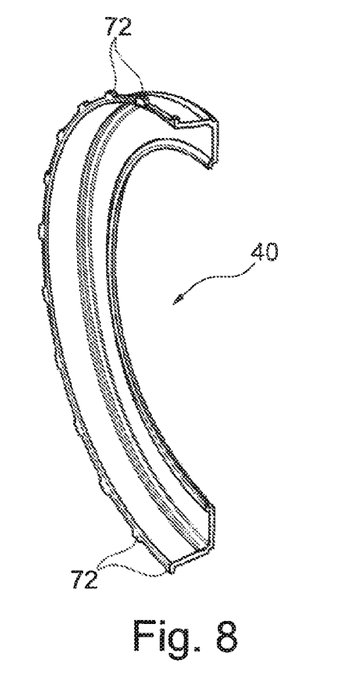
FIG. 8 shows a partly sectional, perspective view of an actuating body of the switching device according to FIGS. 2 to 7.

FIG. 8 shows a partly sectional view of the actuating body 40, which in the present exemplary embodiment is formed as simple formed sheet metal part. The actuating body 40 is formed as piston and according to FIG. 8 includes teeth 72 bent radially to the outside, which engage into corresponding guiding grooves 74 of the coupling component 30 and ensure a substantially non-rotatable and axially shiftable connection with the coupling component 30. In particular for manufacturing reasons, however, it is also conceivable in the alternative that the actuating body 40 is formed in two parts and includes a piston element as well as a separate cone surface element firmly connected with the piston element.

Figure 9:
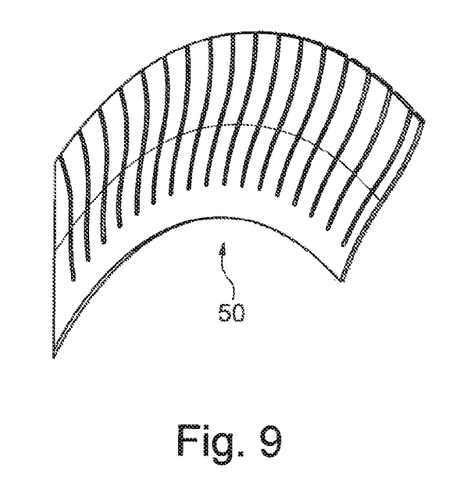
FIG. 9 shows a partly sectional, perspective view of an actuating body spring element of the switching device according to FIGS. 2 to 7.

FIG. 9 shows the partly sectional actuating body spring element 50 which axially urges the actuating body 40 into its starting position according to FIGS. 2 and 3. According to FIG. 9, the actuating body spring element 50 is formed as disk spring and has a flat, ideally slightly sloping spring characteristic. The disk spring forming the actuating body spring element 50 is designed radially slotted according to FIG. 9, so that a particularly uniform axial pressurization of the actuating body 40 is obtained in direction of rotation.

Figure 10:
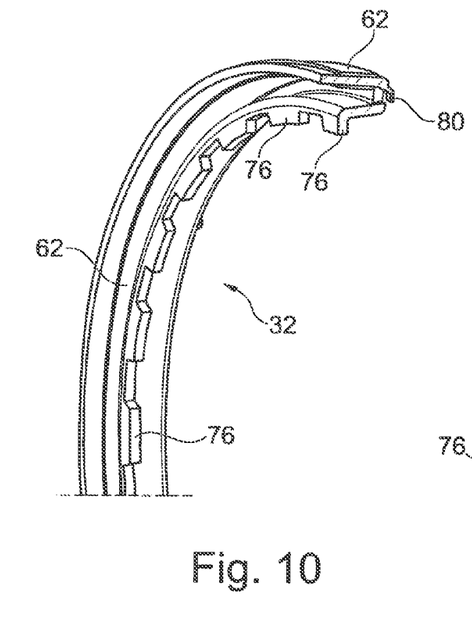
FIG. 10 shows a partly sectional, perspective view of a frictional contact ring of the switching device according to FIGS. 2 to 7.

FIG. 10 shows a partly sectional view of the frictional contact ring 32, which in the present exemplary embodiment is formed as simple formed sheet metal part. According to FIG. 10, the frictional contact ring 32 has radially inwardly bent teeth 76, which engage into corresponding guiding grooves 78 of the transmission shaft element 52 and ensure a substantially non-rotatable and axially shiftable connection with the transmission shaft 24.

Figure 11:
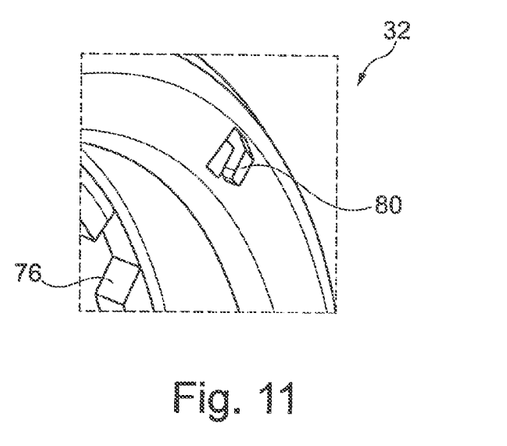
FIG. 11 shows another partly sectional, perspective view of the frictional contact ring of the switching device according to FIGS. 2 to 7.

FIG. 11 shows another partly sectional view of the frictional contact ring 32 in a region for supporting the frictional contact ring spring element 56. In the present exemplary embodiment, several stamped-out bearing tabs 80 uniformly distributed around the circumference of the frictional contact ring 32 are provided as bearings on which the frictional contact ring spring element 56 supports, in order to urge the frictional contact ring 32 into its ventilation position.

Figure 12:
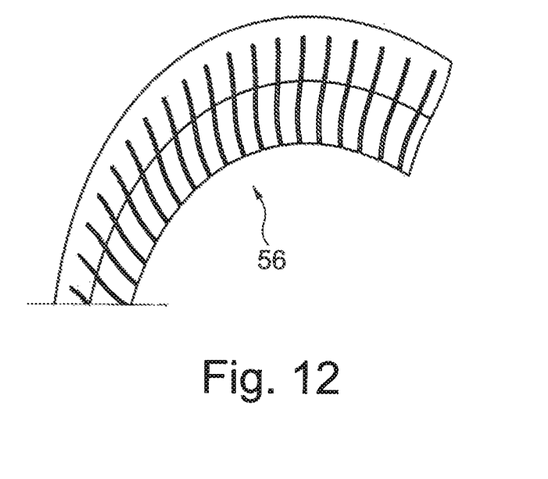
FIG. 12 shows a partly sectional, perspective view of a frictional contact ring spring element of the switching device according to FIGS. 2 to 7.

FIG. 12 shows a partly sectional view of the frictional contact ring spring element 56 which axially urges the frictional contact ring 32 into its ventilation position according to FIGS. 2 and 3. According to FIG. 12, the frictional contact ring spring element 56 is formed as disk spring and has a flat, ideally slightly sloping spring characteristic. The disk spring forming the frictional contact ring spring element 56 is designed radially slotted according to FIG. 12, so that a particularly uniform axial pressurization of the transmission shaft element 52 is obtained in direction of rotation.

Figure 13:
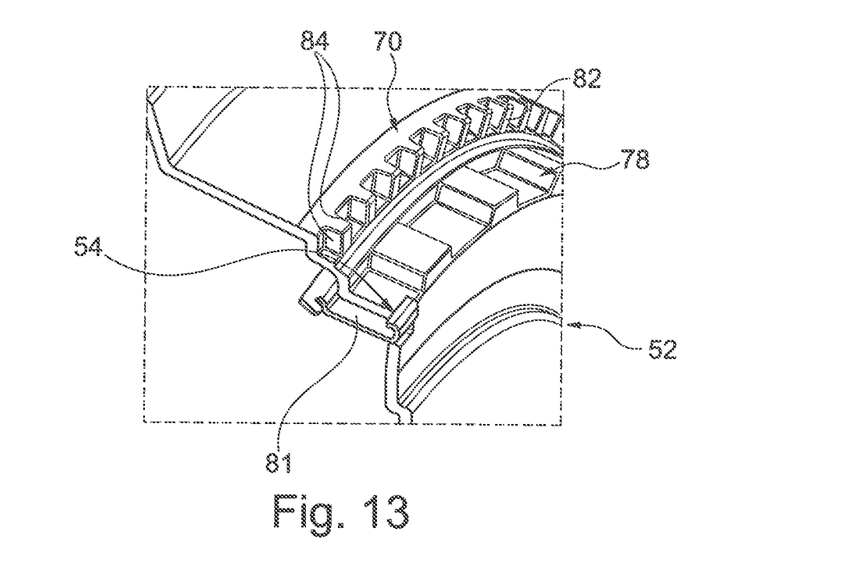
FIG. 13 shows a partly sectional, perspective view of a transmission shaft element firmly connected with a transmission shaft of the switching device according to FIGS. 2 to 7.

FIG. 13 shows a partly sectional view of the transmission shaft element 52 firmly connected with the transmission shaft 24, which in the present exemplary embodiment is formed as simple formed sheet metal part.

What is clearly visible are the guiding grooves 78, into which teeth 76 of the frictional contact ring 32 engage, in order to substantially non-rotatably and axially shiftably connect the frictional contact ring 32 with the transmission shaft 24 via the transmission shaft element 52. In the illustrated embodiment, the axial stop 54 of the transmission shaft element 52 for manufacturing reasons is formed by separate stop clamps 81 distributed around the circumference of the transmission shaft element 52, which in particular are designed as spring steel clamps and are firmly connected, in particular latched or clipped with the transmission shaft element 52.

Furthermore, the second toothing 70 can be seen, which can engage into the first toothing 68 of the form-fit ring 36, in order to positively connect the transmission shaft 24 with the coupling component 30 in direction of rotation (see also FIGS. 6 and 7).

Figure 14:
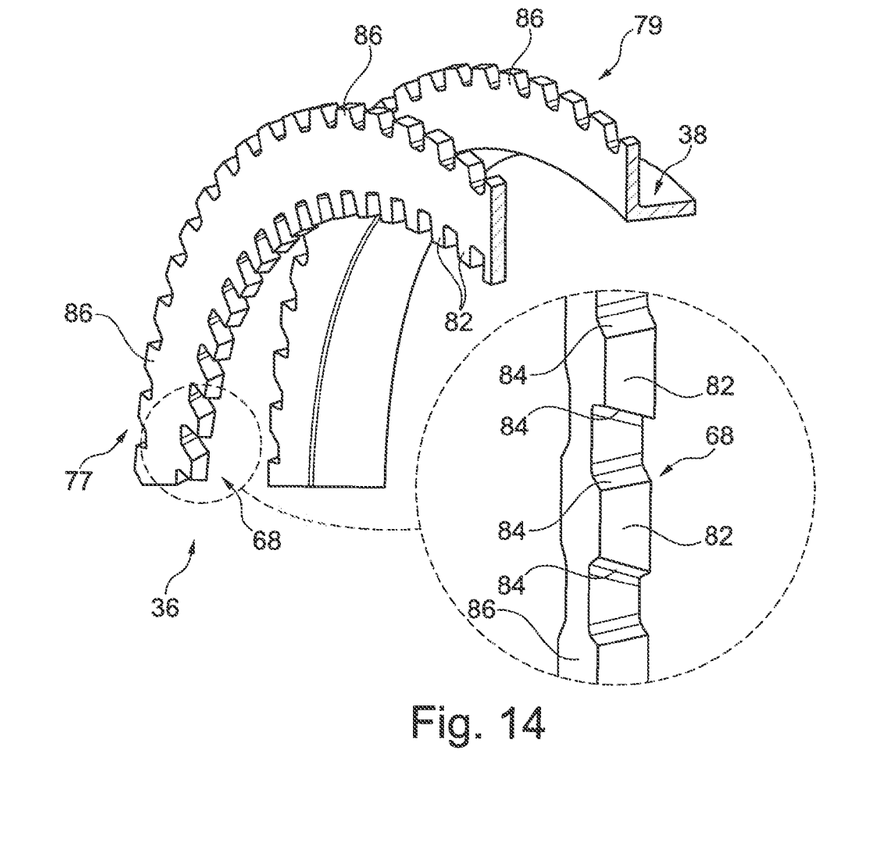
FIG. 14 shows a partly sectional, perspective view of a form-fit ring of the switching device according to FIGS. 2 to 7.

FIG. 14 shows a partly sectional view of the form-fit ring 36, which in the present exemplary embodiment is formed in two parts and includes a toothing element 77 with the first toothing 68 as well as a cone surface element 79 with the cone surface 38, wherein the toothing element 77 and the cone surface element 79 are formed as simple stamped or formed sheet metal parts. Furthermore, there is also shown a detail of the first toothing 68 of the toothing element 77.

According to FIG. 14 both the toothing element 77 of the form-fit ring 36 and the cone surface element 79 of the form-fit ring 36 include teeth 86 radially bent to the outside, which engage into corresponding guiding grooves 88 of the coupling component 30 and ensure a substantially non-rotatable and axially shiftable connection with the coupling component 30.

In an alternative design variant of the motor vehicle transmission, the form-fit ring 36 is formed as single-piece formed sheet metal part and includes the first toothing 68, the cone surface 38 and the teeth 86.

With a view to FIGS. 13 and 14 it is noticeable that the toothings 68, 70 include several teeth 82 distributed in direction of rotation, wherein each tooth 82 of the first toothing 68 includes two opposite tooth flanks 84 inclined with respect to the axial direction, which converge towards the axially adjoining, second toothing 70 in a wedge-shaped manner. Analogously, each tooth 82 of the second toothing 70 includes two opposite tooth flanks 84 inclined with respect to the axial direction, which axially converge in a wedge-shaped manner towards the first toothing 68.

Figure 15:
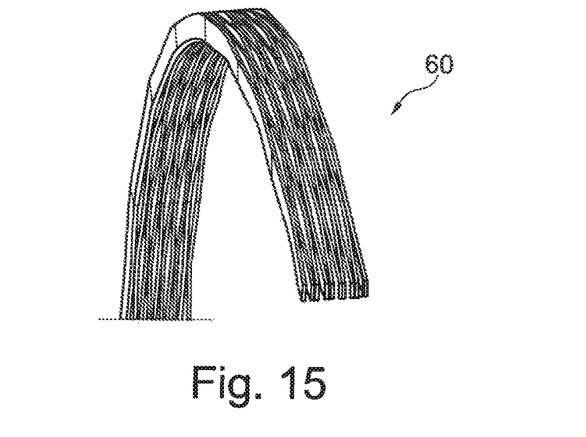
FIG. 15 shows a partly sectional, perspective view of a form-fit ring spring element of the switching device according to FIGS. 2 to 7.

FIG. 15 shows a partly sectional view of the form-fit ring spring element 60, which in the present exemplary embodiment is formed as wave spring pack. The strongly pretensioned wave spring pack is incorporated into the switching device 26 and in the clamped condition has a flat spring characteristic and preferably a spring force of several Kilonewton, particularly preferably in the order of magnitude of about 5 kN.

Finally, FIG. 16 shows a switching device 28 which merely differs from the switching device 26 described above with reference to FIGS. 2 to 7 in that the coupling component 30 is no transmission housing 16, but the further transmission shaft 24 or the transmission shaft element 43 firmly connected with the further transmission shaft 24.

In other words, this means that the chamber 46 rotates about the transmission axis A along with the hydraulic fluid present therein. Due to the rotation of the hydraulic fluid centrifugal forces are produced in the chamber 46, which among other things axially pressurize the actuating body 40 against the force of the actuating body spring element 50 and at a high rotational speed of the further transmission shaft 24 can lead to an undesired frictional contact between the frictional contact ring 32 and the actuating body 40. For compensating the centrifugal forces a partition wall 90 therefore is provided, which in the cylinder portion 44 of the transmission shaft element 34 forms a further chamber 92 in which the actuating body spring element 50 is accommodated. With stationary further transmission shaft 24 the further chamber 92 is filled with largely pressureless hydraulic fluid, so that during a rotation of the further transmission shaft 24 only centrifugal forces are acting. The axial forces on the actuating body 40 formed as piston, which result from the centrifugal forces of the hydraulic fluid in the chambers 46, 92, substantially cancel each other out, so that no undesired speed-dependent axial force resulting from the centrifugal forces of the hydraulic fluid acts on the piston.

The invention claimed is:

1. A switching device for a motor vehicle transmission, comprising a coupling component,
    several transmission shafts, each of which are rotatable about a transmission axis, a frictional contact ring comprising a friction cone, which frictional contact ring is substantially non-rotatably and axially shiftably connected with one of the transmission shafts,
    a form-fit ring comprising a cone surface, which form-fit ring is substantially non-rotatably and axially shiftably connected with the coupling component, as well as
    an actuating body comprising a cone surface, which actuating body is substantially non-rotatably and axially shiftably connected with the coupling component,
    wherein the friction cone of the frictional contact ring extends between the cone surface of the form-fit ring and the cone surface of the actuating body,
    wherein said transmission shaft and the coupling component in an axial starting position of the actuating body are decoupled in a direction of rotation, in an axial frictional contact position of the actuating body are frictionally coupled in the direction of rotation, and in an axial form-fit position of the actuating body are positively coupled in the direction of rotation,
    wherein the form-fit ring in the axially form-fit position is positively connected with the transmission shaft and in a release position is not positively connected with the transmission shaft, and
    wherein the form-fit ring is axially movable between the form-fit position and the release position and is urged into the release position.

2. The switching device according to claim 1, wherein the coupling component is a transmission housing.

3. The switching device according to claim 1, wherein the coupling component is one of a further transmission shaft and a transmission shaft element firmly connected with the further transmission shaft.

4. The switching device according to claim 1, wherein the friction cone includes a cone-shaped friction surface adjoining the cone surface of the actuating body as well as an opposite cone-shaped friction surface adjoining the cone surface of the form-fit ring, wherein the cone-shaped friction surfaces and the cone surfaces are formed coaxial and substantially parallel.

5. The switching device according to claim 1, wherein the coupling component includes an axial stop for the actuating body, the axial stop defining the starting position.

6. The switching device according to claim 1, wherein an actuating body spring element is provided, which axially urges the actuating body into the starting position, wherein the actuating body spring element is supported on the coupling component and on the actuating body.

7. The switching device according to claim 1, wherein one of the transmission shafts and a transmission shaft element firmly connected with said transmission shaft includes an axial stop for the frictional contact ring, the axial stop defining a ventilation position of the frictional contact ring.

8. The switching device according to claim 1, wherein a frictional contact ring spring element is provided, which axially urges the frictional contact ring into a ventilation position, wherein the frictional contact ring spring element is supported on the transmission shaft and on the frictional contact ring.

9. The switching device according claim 1, wherein the coupling component includes an axial stop for the form-fit ring, the axial stop defining the release position of the form-fit ring.

10. The switching device according to claim 1, wherein a form-fit ring spring element is provided which is supported on the coupling component and on the form-fit ring and axially urges the form-fit ring into the release position.

11. The switching device according to claim 1, wherein the actuating body can be urged axially towards its form-fit position by a variable actuating force (FB), wherein the form-fit ring spring element applies a spring force (FF) onto the form-fit ring against the actuating force (FB), the spring force (FF) amounting to about 60%-90% of a maximum actuating force (FB, max).

12. The switching device according to claim 1, wherein a first toothing is formed on the form-fit ring and a second toothing axially adjoining the first toothing is formed on one of the transmission shaft and a transmission shaft element firmly connected with the transmission shaft, wherein the first and second toothings engage into each other in an axial form-fit position of the form-fit ring and positively connect the transmission shaft with the coupling component in direction of rotation.

13. The switching device according to claim 12, wherein the first and second toothings include several teeth distributed in the direction of rotation, wherein each tooth of the toothings includes two opposite tooth flanks inclined with respect to the axial direction, the two opposite tooth flanks axially converging towards the other toothing in a wedge-shaped manner.

14. The switching device according to claim 1, wherein the coupling component includes a cylinder portion and wherein the actuating body is a piston, the piston being axially shiftably guided in the cylinder portion.

15. The switching device according to claim 14, wherein the cylinder portion and the piston define a pressurizable chamber for an axial displacement of the piston.

16. A motor vehicle transmission with several switching devices, wherein each switching device is switchable into a decoupling condition and a coupling condition, wherein at least one switching device is a switching device for a motor vehicle transmission according to claim 1, wherein a drive shaft and a driven shaft are provided, and within the coupling condition the at least one switching device for a motor vehicle transmission is switchable into the frictional contact position and the form-fit position, wherein the at least one switching device for a motor vehicle transmission comprises one of the transmission shafts and the coupling component, wherein the transmission shaft and the coupling component in the decoupling condition are decoupled in the direction of rotation and in the coupling condition are coupled in the direction of rotation either only frictionally or frictionally and positively, wherein by different switching combinations of the switching devices different gear ratios between the drive shaft and the driven shaft are set, wherein the different gear ratios are associated with individual gear stages of the motor vehicle transmission, wherein the at least one switching device for a motor vehicle transmission in a predetermined gear stage assumes the decoupling condition, in another predetermined gear stage assumes the frictional contact position, and in yet another gear stage of the motor vehicle transmission assumes the form-fit position.

17. A method for actuating a motor vehicle transmission, comprising a drive shaft, a driven shaft and several switching devices according to claim 1, wherein each switching device is switchable into a decoupling condition and a coupling condition, and within the coupling condition at least one switching device is switchable into the frictional contact position and the form-fit position, wherein the at least one switching device switchable into the frictional contact position and the form-fit position comprises one of the transmission shafts and the coupling component, wherein the transmission shaft and the coupling component in the decoupling condition are decoupled in the direction of rotation and in the coupling condition are coupled in the direction of rotation either only frictionally or frictionally and positively, wherein by different switching combinations of the switching devices different gear ratios between the drive shaft and the driven shaft are set, wherein the different gear ratios are associated with individual gear stages of the motor vehicle transmission, wherein during a change of the gear stage, at least one of the switching devices of the motor vehicle transmission is switched from the decoupling condition into the coupling condition or from the coupling condition into the decoupling condition in order to change the gear ratio, and wherein a further switching device, which during said change of the gear stage is in the coupling condition and is not required for changing the gear ratio, is switched from the frictional contact position into the form-fit position or from the form-fit position into the frictional contact position, in order to change a torque transmission capacity of said further switching device.

18. The method according to claim 17, wherein the further switching device in its coupling condition transmits a torque between the associated transmission shaft and the associated coupling component, the further switching device in its frictional contact position having a first torque transmission capacity and in its form-fit position having a second torque transmission capacity greater than the first torque transmission capacity.

19. The method according to claim 18, wherein a switching device in the frictional contact position is switched from the frictional contact position into the form-fit position, before the first torque transmission capacity of the switching device is exceeded during a change of the gear stage.

20. The switching device for a motor vehicle according to claim 1, which switching device is a fully automatic stepped transmission.

* * * * *